US011919275B2

(12) United States Patent
Varga et al.

(10) Patent No.: US 11,919,275 B2
(45) Date of Patent: Mar. 5, 2024

(54) COMPOSITE PANE WITH AN INTEGRATED LIGHT SENSOR AND HOLOGRAPHIC OPTICAL ELEMENT

(71) Applicant: SAINT-GOBAIN GLASS FRANCE, Courbevoie (FR)

(72) Inventors: Gabor Varga, Herzogenrath (DE); Michael Zeiss, Heinsberg-Haaren (DE); Christian Effertz, Aachen (DE); Doane Shelby Craig, Herzogenrath (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 301 days.

(21) Appl. No.: 17/432,328

(22) PCT Filed: Feb. 5, 2020

(86) PCT No.: PCT/EP2020/052791
§ 371 (c)(1),
(2) Date: Aug. 19, 2021

(87) PCT Pub. No.: WO2020/169339
PCT Pub. Date: Aug. 27, 2020

(65) Prior Publication Data
US 2022/0136893 A1  May 5, 2022

(30) Foreign Application Priority Data
Feb. 21, 2019  (EP) .................................... 19158506

(51) Int. Cl.
*B60J 1/00* (2006.01)
*B32B 17/10* (2006.01)
(Continued)

(52) U.S. Cl.
CPC ........ *B32B 17/10293* (2013.01); *B32B 17/10* (2013.01); *B32B 17/10036* (2013.01);
(Continued)

(58) Field of Classification Search
CPC .................................. B60J 1/001; G02B 5/32
See application file for complete search history.

(56) References Cited

U.S. PATENT DOCUMENTS 6,104,689 A    8/2000  Noguchi
2004/0051806 A1  3/2004  Cambou et al.
(Continued)

FOREIGN PATENT DOCUMENTS

CN    107046805 A    8/2017
DE    41 27 656 A1    2/1993
(Continued)

OTHER PUBLICATIONS

International Search Report as issued in International Patent Application No. PCT/EP2020/052791, dated Mar. 4, 2020.
(Continued)

*Primary Examiner* — Thanh Luu
(74) *Attorney, Agent, or Firm* — Pillsbury Winthrop Shaw Pittman LLP (57) ABSTRACT

A composite pane and in particular a composite vehicle pane with an integrated light sensor, includes an outer pane and an inner pane that are joined to one another via at least one thermoplastic intermediate layer, and at least one light sensor with at least one light-sensitive surface that is arranged between the outer pane and the inner pane, wherein the light-sensitive surface faces the outer pane and a holographic optical element is arranged between the light-sensitive surface and the outer pane, and the holographic optical element is implemented as a hologram for incident-angle-dependent diffraction of the incident light.

21 Claims, 5 Drawing Sheets

(51) Int. Cl.
*G01J 1/04* (2006.01)
*G02B 5/32* (2006.01)
*G03H 1/00* (2006.01)

(52) U.S. Cl.
CPC .... *B32B 17/1044* (2013.01); *B32B 17/10761* (2013.01); *B32B 17/1077* (2013.01); *B32B 17/10788* (2013.01); *B60J 1/001* (2013.01); *G01J 1/0407* (2013.01); *G02B 5/32* (2013.01); *G03H 1/0005* (2013.01); *G03H 2001/0033* (2013.01)

(56) References Cited

U.S. PATENT DOCUMENTS

| | | | |
|---|---|---|---|
| 2004/0113053 A1* | 6/2004 | Michenfelder | B60Q 1/1423 250/214 R |
| 2008/0212101 A1 | 9/2008 | Wolf et al. | |
| 2018/0326705 A1 | 11/2018 | Effertz et al. | |
| 2020/0386927 A1* | 12/2020 | Park | G03H 1/0248 |
| 2021/0021745 A1* | 1/2021 | Mannheim Astete | B32B 17/10165 |

FOREIGN PATENT DOCUMENTS

| | | |
|---|---|---|
| DE | 10 2004 054465 A1 | 5/2006 |
| EP | 2 100 722 A2 | 9/2009 |
| JP | H05-323238 A | 12/1993 |
| JP | H07-16491 U | 3/1995 |
| JP | 2008-524557 A | 7/2008 |
| JP | 2018-537377 A | 12/2018 |
| KR | 10-2007-0084148 A | 8/2007 |
| KR | 10-2018-0022932 A | 3/2018 |
| WO | WO 2018/037218 A1 | 3/2018 |

OTHER PUBLICATIONS

First Office Action and Search Report as issued in Chinese Patent Application No. 202080000583.1, dated Aug. 24, 2022.
Communication under Article 94(3) EPU as issued in European Patent Application No. 20702329.2, dated Oct. 14, 2022.
Examination Report as issued in Indian Patent Application No. 202147041254, dated Sep. 19, 2022.
Notice of Reasons for Rejection as issued in Japanese Patent Application No. 2021-548674, dated Jul. 26, 2022.
Decision of Final Rejection as issued in Japanese Patent Application No. 2021-548674, dated Feb. 21, 2023.
Notice of Preliminary Rejection as issued in Korean Patent Application No. 10-2021-7026166, dated Jul. 19, 2023.

* cited by examiner

COMPOSITE PANE WITH AN INTEGRATED LIGHT SENSOR AND HOLOGRAPHIC OPTICAL ELEMENT

CROSS-REFERENCE TO RELATED APPLICATIONS

This application is the U.S. National Stage of PCT/EP2020/052791, filed Feb. 5, 2020, which in turn claims priority to European patent application number 19 158 506.6 filed Feb. 21, 2019. The content of these applications are incorporated herein by reference in their entireties.

The invention relates to a composite pane and in particular to a composite vehicle pane with an integrated light sensor, a method for production thereof, and use thereof.

It is known to equip vehicles with light sensors to determine the amount of available daylight, and, on this basis, for example, to operate the vehicle headlights as needed. Conventional light sensors are installed as add-on parts, in particular on the interior-side surface of the windshield, for example, in the region of the rearview mirror.

From EP2100722A2, a light sensor is known, which is laminated into a windshield, i.e., is arranged between the outer pane and the inner pane of the windshield, wherein the panes are bonded to one another by a thermoplastic intermediate layer. Thus, the windshield can be provided, in a compact manner, with the integrated light sensor; subsequent mounting of the light sensor is eliminated. The light sensor is implemented in the form of flip-chip photodiodes on a printed circuit board.

The object of the present invention is to provide a further improved composite pane having an integrated light sensor, which can be produced as simply and economically as possible, and wherein the integrated light sensor is characterized by a flat structure.

The object of the present invention is accomplished according to the invention by a composite pane according to claim 1. Preferred embodiments emerge from the subclaims.

The composite pane according to the invention and in particular the composite vehicle pane according to the invention comprises at least an outer pane and an inner pane that are joined to one another via at least one thermoplastic intermediate layer, and
at least one light sensor with at least one light-sensitive surface that is arranged between the outer pane and the inner pane,
wherein
the light-sensitive surface faces the outer pane and
a holographic optical element is arranged between the light-sensitive surface and the outer pane, and
the holographic optical element is implemented as a hologram for incident-angle-dependent diffraction of incident light.

The composite pane according to the invention with an integrated light sensor comprises at least an outer pane and an inner pane that are joined to one another via a thermoplastic intermediate layer. It goes without saying that the terms "outer pane" and "inner pane" are freely selected and merely represent a direction with respect to incident light that strikes the composite pane via the outer pane. As a composite vehicle pane, the composite pane is provided to separate a vehicle interior from an external environment. The composite vehicle pane is thus a window pane that is inserted in a window opening of the vehicle body or is intended for that purpose. The vehicle pane according to the invention is, in particular, a windshield, roof panel, or rear window of a motor vehicle. The term "inner pane" refers to that pane that faces the interior of the vehicle in the installed position. The term "outer pane" refers to that pane that faces the external environment of the vehicle in the installed position. The thermoplastic intermediate layer is typically formed from at least one thermoplastic film.

That surface of the respective pane that faces the external environment of the vehicle in the installed position is referred to as the "exterior-side surface". That surface of the respective pane that faces the interior of the vehicle in the installed position is referred to as the "interior-side surface". The interior-side surface of the outer pane is joined to the exterior-side surface of the inner pane via the thermoplastic intermediate layer. Customarily, the exterior-side surface of the outer pane is referred to as "side I"; the interior-side surface of the outer pane as "side II"; the exterior-side surface of the inner pane as "side III"; and the interior-side surface of the inner pane as "side IV".

The invention further includes a light sensor, comprising:
a light sensor with at least one light-sensitive surface, wherein
a holographic optical element is arranged side of the light sensor facing the light-sensitive surface, and
the holographic optical element is implemented as a hologram for incident-angle-dependent diffraction of incident light.

The invention further includes a single pane with a light sensor, comprising:
an outer pane and
at least one light sensor with at least one light-sensitive surface that is arranged on an inner side II of the outer pane,
wherein
the light-sensitive surface faces the outer pane and
a holographic optical element is arranged between the light-sensitive surface and of the outer pane, and
the holographic optical element is implemented as a hologram for incident-angle-dependent diffraction of incident light.

Here, the outer pane is synonymous with the single pane.

It goes without saying that the preferred exemplary embodiments below apply to the light sensor according to the invention, the single pane according to the invention, and the composite pane according to the invention to the extent this is technically possible.

In an advantageous embodiment, the light sensor according to the invention has exactly one light-sensitive surface. This means that the light-sensitive surface of an individual light sensor is not further segmented and that the measurement signal that is output by the light sensor summarizes the amount of light striking the light-sensitive surface. Such light sensors are particularly economical and simple in the evaluation of the electrical signal.

In an alternative advantageous embodiment, the light sensor according to the invention has a plurality of light-sensitive surfaces or one light-sensitive surface that is segmented into a plurality of partial surfaces. This means that different electrical signals can be assigned to different areas of the light-sensitive surface. Such light sensors already provide spatially resolved data relative to incident light beams and can better distinguish between them.

It goes without saying that the light-sensitive surface is not a mathematical area, but, rather, a light-sensitive layer with a certain layer thickness, which is, however, usually significantly less than its lateral extent.

The light-sensitive surface of the light sensor according to the invention faces the outer pane. This means that only light that enters the composite pane via the outer pane can reach the light-sensitive surface of the light sensor and the light sensor reacts only to this light.

The light-sensitive surface is completely covered with a protective layer that protects the exposed surface of the light-sensitive surface against mechanical and chemical damage, for example, against moisture.

The protective layer is transparent or sufficiently transparent to the detection wavelength range of the light sensor. This means, advantageously, that the transmittance for the wavelength range for which the light sensor is technically designed is more than 20%, preferably more than 50%, particularly preferably more than 70%, and in particular more than 90%.

The protective layer is arranged on the side of the light sensor facing the outer pane and directly on the light-sensitive surface. It goes without saying that the protective layer at least completely covers the light-sensitive surface, but can also project beyond the light-sensitive surface, which is usually the case. In the following, the protective layer is considered to be part of the light sensor or a component of the light-sensitive surface.

Furthermore, a holographic optical element is arranged between the light-sensitive surface and the outer pane.

Collectively referred to as holographic optical elements (HOE) are those optical elements whose functional principle is based on holography. Instead of using the geometric shape of an object reflecting or transmitting light, as, for example, with lenses or mirrors, holographic optical elements change the light in the beam path using information stored in a hologram. The information stored in the hologram is usually stored as a change in the refractive index. The holograms used are usually produced not as images of real objects, but as a superposition of different flat or spherical light waves whose interference pattern generates the desired optical effect. In other words, the holographic optical elements are based on the effect of planar diffractive structures. Such holographic optical elements can, for example, deflect or diffract light for a certain angle of incidence range, but be completely transparent for a different angle of incidence range or can direct light in a different direction.

The particular advantage of such holographic optical elements resides, in addition to their diverse optical functional properties, in their low thickness and film-like nature that allows the elements to be produced simply and economically and laminated into a composite pane.

The composite pane according to the invention makes it possible to determine the direction of light incidence relative to the outer pane of the composite pane by skillful utilization of the functional properties of the holographic optical element.

In an advantageous embodiment, the holographic optical element according to the invention is implemented such that it directs light incident on the outer pane in a first angle of incidence range alpha at least in some sections onto the light-sensitive surface and directs light incident in a second angle of incidence range at least in some sections and preferably completely next to the light-sensitive surface.

In another advantageous embodiment of the holographic optical element according to the invention, the first angle of incidence range alpha includes all angles of incidence phi from 0° to 60°, preferably from 0° to 45°, and in particular from 10° to 30°, and/or the second angle of incidence range beta includes all angles of incidence phi from −90° to 0°, preferably from −60° to −5°, and in particular from −30° to −10°.

In an advantageous embodiment of a light sensor according to the invention, the holographic optical element is arranged directly on the light sensor and/or on the interior-side surface II of the outer pane. It goes without saying that the holographic optical element can simultaneously have direct contact with the light sensor and the interior-side surface II of the outer pane arranged above it.

In another advantageous embodiment, the holographic optical element according to the invention is arranged directly above the light-sensitive surface, i.e., the holographic optical element is at least completely arranged in the region of the orthogonal projection of the light-sensitive surface on the outer pane. In other words, the holographic optical element covers the light-sensitive surface at least completely with respect to an orthogonal light incidence on the outer pane. It goes without saying that the holographic optical element can project beyond the light-sensitive surface on one side, on multiple sides, or on all sides (in the projection).

In another advantageous embodiment, the holographic optical element according to the invention is film-like. Advantageously, the thickness d of the holographic optical element is from 10 µm to 10000 µm, preferably from 10 µm to 10000 µm, particularly preferably from 50 µm to 500 µm, and in particular from 100 µm to 500 µm.

In another advantageous embodiment, the composite pane according to the invention contains at least two, preferably exactly two, or exactly four light sensors.

In another advantageous embodiment, the composite pane according to the invention contains four light sensors with four differently oriented holographic optical elements. It goes without saying that the four differently oriented holographic optical elements can also be implemented as four different functional areas of one or two holographic optical elements.

In this case, it is particularly advantageous for the composite pane to have a first arrangement of two light sensors whose holographic optical element or whose holographic optical elements have functionally opposite incident angle ranges, and for the composite pane to further have a second arrangement with two light sensors whose holographic optical element or whose holographic optical elements have functionally opposite incident angle ranges, and for the first arrangement to be arranged orthogonally relative to the second arrangement.

In another advantageous embodiment of a composite pane according to the invention, the light sensor(s) are arranged on at least one printed circuit board, preferably on at least one flexible printed circuit board, and contacted thereon with conductor tracks. This enables easy connection of the light sensors to the corresponding evaluation electronics of the vehicle.

Depending on the measured origin of an ambient light, the switching state of the headlights can, for example, be controlled automatically by the evaluation and control electronics. Thus, convenience is enhanced for the vehicle driver, who no longer has to take care of manually turning the headlights on and off. Other applications are, for example, automatic electrical switching of the transmittance properties of the entire pane or a pane area and the brightness control of display elements in the vehicle interior.

Due to their small dimensions, SMD components are particularly suitable for use as light sensors according to the invention that are to be laminated into a composite pane. As is generally known to the person skilled in the art, SMD is the acronym for the term surface-mounted device. SMD components have no wire connections, but are, instead, soldered directly onto the printed circuit board by means of solderable connection pads. Conventional components must be routed through mounting holes and soldered on the back of the printed circuit board. This is eliminated with SMD components. Thus, very dense mountings become possible, reducing space requirements. Advantageously from a process technology standpoint, the drilling of holes in the printed circuit board is eliminated. Weight is reduced through smaller components and the elimination of connecting wires. SMD technology is also particularly suitable for automated mounting (automated picking and placing of light sensors, automated soldering), which is particularly advantageous for industrial mass production. SMD light sensors typically have a housing, in particular a plastic housing, around the actual chip. Alternatively, so-called "flip chip light sensors" can be used.

The terms "light sensor", also called "photodetector", "optical detector", or "optoelectronic sensor" refer to electronic components that convert light, in particular using the photoelectric effect, into an electrical signal or exhibit electrical resistance depending on the incident radiation. In optoelectronics and also in the context of the present invention, the term "light" refers not only to visible light, but also to invisible infrared light and ultraviolet radiation.

For light sensors in the visible spectral range, photodiodes that are sensitive in the visible spectral range are preferably used. Advantageously, the spectral sensitivity distribution should be aligned with that of the human eye such that the amount of light measured matches the amount of light perceived by the vehicle occupants as well as possible. Unwanted switching operations that are caused by radiation not perceived as relevant by humans can be avoided. There is an advantageous adaptation when the photodiode has sensitivity in the entire spectral range between 500 nm and 600 nm, which corresponds to at least 50% of its sensitivity maximum, preferably at least 60%. The sensitivity maximum should be in the range from 450 nm to 600 nm, in particular in the range from 490 nm to 570 nm. Sensitivity can also be referred to as detection efficiency and can be quantified as the ratio of photons detected to the total number of photons of the respective wavelengths impacting the photodiode. The desired spectral sensitivity is ideally influenced by the type of active material of the photodiode. However, alternatively, an optical filter can be used to achieve the desired spectral sensitivity, for example, a filter film arranged externally to the photodiode. It goes without saying that this film is part of the photodiode or of the protective layer.

The circuit board can also be referred to as a card, printed circuit, or printed circuit board (PCB). It serves for mechanical attachment and electrical connection of the photodiodes arranged thereon. Printed circuit boards are made of electrically insulating material, in particular plastic, with conducting connections (conductor tracks) adhering thereon. The conductor tracks can have local widenings that serve as soldering pads for the components.

In a preferred embodiment, the printed circuit board is a flexible printed circuit board, also known as a flexboard. Such printed circuit boards are formed from flexible, bendable polymer films, for example, polyimide films. They have a thickness of preferably less than 0.38 mm and greater than 50 μm, particularly preferably of 120 μm to 180 μm. Therewith, particularly good results are achieved in terms of flexibility, on the one hand, and stability, on the other. Because of the flexibility and the low thickness, flexible printed circuit boards are particularly suitable for being laminated into a composite pane, in particular a curved composite pane.

When the light sensors are SMD components, an SMD printed circuit board is expediently used.

The printed circuit board can be arranged directly on one of the panes, in particular with the side facing away from the light sensor on the exterior-side surface of the inner pane. It has been demonstrated that the presence of the physically limited printed circuit board does not result in a substantial reduction in the stability of the laminate. The printed circuit board can, however, also be arranged between two thermoplastic layers, i.e., between two plies of the thermoplastic intermediate layer.

The printed circuit board has at least two connection pads for external electrical contacting (for example, anode and cathode). These connection pads serve for connecting the printed circuit board to external evaluation and control electronics via connection cables in order to forward the current pulse generated by the light sensor upon incidence of light to the evaluation and control electronics. The contacting of the connection pads is preferably done with a flat conductor (also called a flat strip conductor or film conductor), comprising an electrically conducting film and an optional, polymeric sheathing, which must, of course, have an opening at the connection point. Preferably, a flat conductor is connected to the connection points of the printed circuit board, for example, via a soldering compound or an electrically conductive adhesive. Preferably, a multipole flat conductor is used, with each pole connected to a connection pad. However, alternatively, a separate flat conductor can also be used for each connection pad. The flat conductor preferably has, on its end away from the printed circuit board, a plug connector (plug or coupling) for connection to additional cables of the vehicle's electrical system.

The printed circuit board is preferably arranged completely within the interior of the composite pane and contacted by a flat conductor that extends out of the composite pane beyond the side edge. The contacting of the printed circuit board by the flat conductor is done before the production of the composite pane, during which the printed circuit board is then arranged in the composite stack such that it is arranged completely within the area of the panes. The advantage consists in a reduced risk of breakage for the printed circuit board which is typically more susceptible to damage than is the flat conductor.

Alternatively, the printed circuit board can also extend out of the interior of the composite pane beyond its side edges, with the light sensors arranged in the interior of the composite pane and the connection pads for the connection cable arranged outside the composite pane. The contacting of the printed circuit board by the connection cable can then be done after the production of the composite pane. Thus, the composite pane with the integrated light sensor can, for example, be sold without a connection cable to the automaker, who then, before installation of the composite pane, undertakes the contacting. It goes without saying that the flat conductor can also be connected to the printed circuit board in advance and the composite pane with an integrated light sensor provided together with the connected flat conductor.

The printed circuit board and the flat conductor with the plug connector can also be formed in one piece such that the flat conductor is, so to speak, an integral component of the printed circuit board with a shared polymeric sheathing. Such a printed circuit board has advantages from a process technology standpoint since, during the production of the composite pane, the soldering of the flat conductor onto the connection pads of the circuit board is eliminated.

That side edge beyond which the printed circuit board or a flat conductor connected thereto extends is, in the context of the invention, referred to as the side edge that is associated with the printed circuit board or the light sensor.

In an advantageous embodiment, a plurality of light sensors, preferably at least two, particularly preferably four light sensors, are arranged on one printed circuit board. Better spatial resolution of the radiation direction of the light detected can be achieved with multiple light sensors.

In an advantageous embodiment, the distance between adjacent light sensors is at most 3 cm, preferably at most 2 cm, for example, from 1 cm to 2 cm.

The printed circuit board has, in a preferred embodiment, a maximum width of at least 15 cm, preferably at least 20 cm. In the context of the invention, "width" refers to the dimension substantially parallel to the side edge associated with the light sensor. The maximum width is the greatest width that occurs along the entire length of the printed circuit board if the width is not constant. In other words, the printed circuit board preferably has at least one section with a width of at least 15 cm, particularly preferably at least 20 cm.

In a preferred embodiment, the printed circuit board has an end section and a lead section, with the lead section having a smaller width than the end section. The light sensors are arranged in the end section; and the connection pads for the connection cable, in the lead section, in particular in the vicinity of the end of the lead section facing away from the end section. The lead section is less distant from the associated side edge than the end section and preferably extends out of the composite pane, beyond this side edge. Such a printed circuit board is implemented, for example, in a T-shape, wherein the transverse bar (being the end section) is turned away from the associated side edge. The lead section preferably has a length of 1 cm to 12 cm, particularly preferably of 2 cm to 8 cm. The lead section preferably has a width of 2 cm to 15 cm, particularly preferably of 3 cm to 10 cm. The end section preferably has a length of 0.5 cm to 3 cm, particularly preferably of 1 cm to 2 cm. The end section preferably has a width of 15 cm to 40 cm, particularly preferably of 20 cm to 30 cm. With such a printed circuit board, particularly good results are obtained in terms of efficiency and space-saving design.

Alternatively, however, the printed circuit board can also be rectangular. Theoretically, it can then also be divided into an end section with the light sensors and a lead section with the electrical contacts, wherein, however, the lead section and the end section have the same width.

In an advantageous embodiment, the composite pane includes a plurality of light sensors, i.e., a plurality of printed circuit boards with, in each case, at least one photodiode. This offers, on the one hand, the advantage of redundancy: in the event of failure of one light sensor, functionality can nevertheless be ensured by the one or more other light sensors. On the other hand, the presence of multiple light sensors distributed over the composite pane enables distinguishing between a local, virtually punctiform source of radiation, such as a streetlight, and the ambient light. Misinterpretations by the evaluation and control electronics can thus be avoided. For example, it is possible to avoid a streetlight being misinterpreted as bright ambient light and the vehicle lighting being turned off at night as a result. Also possible is a determination of the directional dependence of the incident radiation via a comparison of the intensities that are measured by the various light sensors.

The direction of incidence of the light detected in the entire half-space above the outer pane can be determined by a plurality of light sensors on a printed circuit board or by the use of a plurality of light sensor elements in a composite pane. Thus, for example, the current position of the sun can be determ fined.

In a preferred embodiment, the width of each light sensor is less than 2 mm. Here, the term "width" means the maximum lateral extension in a plane parallel to the printed circuit board. Thus, the light sensors can be unobtrusively integrated into the composite pane. Any necessary holes in a masking print behind which the light sensor is to be hidden can be designed small and unobtrusive. The height of the light sensors (extension perpendicular to the printed circuit board) is preferably less than 0.7 mm, particularly preferably less than 0.6 mm. The light sensors can then be integrated into the composite pane with the use of the standard thickness of the thermoplastic intermediate layer of 0.76 mm.

The inner pane and the outer pane are preferably made of glass, particularly preferably soda lime glass, which has proven itself for window glass. However, the panes can also be made of other types of glass, for example, of borosilicate glass or aluminosilicate glass. In principle, the panes can also alternatively be made of plastic, in particular polycarbonate (PC) or polymethyl methacrylate (PMMA). It goes without saying that the composite pane can also have one glass pane and one plastic pane.

The thickness of the panes can vary greatly and thus be ideally adapted to the requirements of the individual case. Preferably, the thicknesses of the outer pane and the inner pane are from 0.5 mm to 10 mm, particularly preferably from 1 mm to 5 mm, most particularly preferably from 1.2 mm to 3 mm.

The outer pane, the inner pane, or the intermediate layer can be clear and colorless but also tinted, frosted, or colored. The total transmittance through the composite pane is, in a preferred embodiment, greater than 70%, in particular when the composite pane is a windshield. The term "total transmittance" is based on the process for testing the light permeability of motor vehicle windows specified by ECE-R 43, Annex 3, § 9.1. The outer pane and the inner pane can be made of non-prestressed, partially prestressed, or prestressed glass.

The composite vehicle pane is preferably curved in one or a plurality of spatial directions, as is customary for motor vehicle panes, with typical radii of curvature in the range from approx. 10 cm to approx. 40 m. The composite glass can, however, also be flat, for example, when it is intended as an architectural pane, for example, in building glazing, or as a pane for buses, trains, or tractors.

The intermediate layer contains at least one thermoplastic polymer, preferably ethylene vinyl acetate (EVA), polyvinyl butyral (PVB), or polyurethane (PU) or mixtures or copolymers or derivatives thereof, particularly preferably PVB. The intermediate layer is formed from at least one thermoplastic film. The thickness of a thermoplastic film is preferably from 0.2 mm to 2 mm, particularly preferably from 0.3 mm to 1 mm, for example, 0.38 mm or 0.76 mm. The intermediate layer can also be implemented as a so-called "acoustic film", which has a noise-damping effect. Such films typically consist of at least three layers, with the middle layer having higher plasticity or elasticity than the outer layers surrounding it, for example, as a result of a different plasticizer content.

The printed circuit board is preferably arranged in a nontransparent region of the composite glass pane such that it is hardly visible or not at all. In this region, vision through the pane is prevented by an opaque element. For this, in the automotive sector, opaque masking prints on one or on both panes are customary. Alternatively, however, vision through the pane can also be prevented, for example, by a colored thermoplastic film of the intermediate layer or an opaque insert element. Preferably, the opaque element is arranged on the interior side relative to the light sensor, thus having less distance from the interior or from the interior-side surface of the inner pane than the light sensor. Then, the light sensor is not visible from the inside, while light can strike it from the outside such that it can fulfill its function. It can be particularly preferable for opaque elements to be mounted in front of and behind the printed circuit board in the direction of vision, i.e., an opaque element, in each case, on the interior side and on the exterior side relative to the light sensor. Then, the printed circuit board is visible neither from the outside nor from the inside. In order for the light sensor to be able to fulfill its function, the opaque element must, of course, have openings at the position of the light sensors, since, otherwise, detection of light would not be possible. An opaque element arranged on the interior side relative to the light sensor is preferably realized by a masking print on the inner pane; an opaque element arranged on the exterior side relative to the light sensor, by a masking print on the outer pane. Masking prints are customary for motor vehicle panes outside the central vision region to conceal add-on parts or to protect the adhesive with which the motor vehicle pane is bonded to the body against UV radiation. The masking print typically consists of a black or dark enamel applied and baked in a screen printing process.

Alternatively, however, it can also be desirable not to hide the printed circuit board by a masking print such that it is visible from the outside. In particular, this increases the production tolerances since the printed circuit board need not be so precisely positioned in order to coincide with any openings in the black print.

It is also possible to combine the light sensor according to the invention with other sensors, enabling advantageously space-saving construction. The light sensor can, for example, be combined with a rain sensor, in particular a capacitive rain sensor which determines the presence of moisture on the pane by means of a capacitive change of at least one electrode. The conductive structures serving as electrodes can, for example, be arranged on the printed circuit board or on the inner pane. The rain sensor and the light sensor are preferably arranged in spatial proximity to one another or spatially superimposed, thus enabling realization of a space-saving combined sensor element.

The invention further includes a method for producing a composite vehicle pane with an integrated light sensor. Here, first, an outer pane, an inner pane, at least one thermoplastic film, and at least one light sensor situated on a circuit board are arranged as a stack such that the film and the light sensor are arranged between the outer pane and the inner pane. The two panes and the film or films positioned therebetween are, of course, arranged one atop another flat and substantially congruent. The printed circuit board with the light sensors is inserted into a region of this stack. The stack is subsequently subjected to customary methods for producing composite panes. The outer pane is bonded to the inner pane by lamination via a thermoplastic intermediate layer, which is formed during the process from the at least one thermoplastic film. This is done using customary methods known per se to the person skilled in the art, for example, autoclave methods, vacuum bag methods, vacuum ring methods, calender methods, vacuum laminators, or combinations thereof.

The bonding of the outer pane and the inner pane is customarily done under the action of heat, vacuum, and/or pressure.

Preferably, the printed circuit board is connected in advance to a flat conductor and only arranged in the stack thereafter. Preferably, it is arranged such that the printed circuit board is arranged completely within the area of the panes and the flat conductor extends beyond its side edges. The connection between the flat conductor and the connection pads of the printed circuit board can be done, for example, by soldering or via an electrically conductive adhesive.

If the composite vehicle pane is to have a curvature, as customary in particular for passenger cars, the panes are subjected, before lamination, to a bending process, for example, by gravity bending, suction bending, and/or press bending. Typical bending temperatures are from 500° C. to 700° C.

Preferably, an opaque masking print is applied on the edge region of the outer pane and the inner pane before the lamination and before the optional bending. For this, typically, a black or dark enamel is applied by screen printing and baked before the lamination, in particular, before the bending or during the bending.

The printed circuit board can be placed directly on one of the panes, in particular with the side facing away from the light sensors on the exterior-side surface of the inner pane. All films of the intermediate layer are then arranged on one side of the printed circuit board. However, alternatively, the printed circuit board can also be inserted between two thermoplastic films that enclose the circuit board in a sandwich-like manner.

A thermoplastic film not further processed in advance can be used. During lamination, the heated, flowable thermoplastic material flows into the spaces around the light sensors and the printed circuit board such that a stable composite is ensured.

In order to improve the optical quality of the composite pane, it can be advantageous to prepare the thermoplastic film (or at least one thermoplastic film in the case of use of a plurality of films) by providing openings for the light sensor.

Large-area holes, into which the entire printed circuit board is inserted, can be produced in the film. Preferably, the printed circuit board is then surrounded sandwich-like by two relatively thin film sections in order to compensate for the difference in height between the printed circuit board and the film and to ensure the adhesion of the composite.

Alternatively, in an advantageous embodiment, the thermoplastic film is provided with holes or indentations before lamination. These holes or indentations are coordinated in size, position, and arrangement with the light sensor(s). This means that the lateral dimensions of the holes or indentations substantially correspond to the dimensions of the light sensors or are slightly larger, in particular are at most 150% or at most 120% of the dimensions of the light sensors. The position of the holes or indentations corresponds to the desired positioning of the light sensor in the composite pane to be manufactured. The arrangement of the holes or indentations relative to one another corresponds to the arrangement of the light sensors relative to one another if a plurality of light sensors are used. The holes and indentations, on the one hand, and the light sensors, on the other, are thus, so to speak, in a key-to-keyhole relationship with one another. At the time of arrangement of the stack for lamination, the light sensors are inserted into the holes or indentations. Thus, the light sensors are effectively embedded in the intermediate layer. Moreover, the position of the light sensors is defined during production, which is advantageous in terms of mass production. The holes or indentations can be produced just prior to the lamination. However, the films with the defined holes or indentations can also be prepared in large quantities or even procured in this form from the film supplier.

The film can be provided with through-holes. If the film has a thickness that is greater than the height of the light sensors, an actually undesirable cavity remains. This can, optionally, for example, be filled by small cutouts of the thermoplastic film. More advantageously, since it is simpler from a process technology standpoint, the film can be provided with indentations whose depth substantially corresponds to the height of the light sensors instead of through-holes. The undesirable cavity is thus avoided without necessary postproduction work. The indentations are introduced, for example, by punching.

The invention also includes the use of a composite pane according to the invention with an integrated light sensor as a vehicle pane, preferably in water, land, or air vehicles, and, in particular, preferably as a windshield, rear window, or roof panel of a motor vehicle, in particular of a passenger car. Preferably, the at least one light sensor is connected to evaluation and control electronics of the vehicle.

As a function of the ambient light measured by the at least one light sensor, one or a plurality of the following switching states can, for example, be controlled:
  the switching state of the vehicle lighting (in particular headlights, taillights, and side marker lights): upon dropping below a predefined threshold value, the lighting is turned on; upon exceeding the predefined threshold, the lighting is turned off.
  the transmittance properties of a region of the composite pane that is equipped with an electrically switchable or controllable functional element. Said region of the pane is in particular a switchable or controllable glare shield in the upper third of the pane (also known as a "shaded band"). The switching state can be controlled as a function of the absolute amount of ambient light or as a function of the position of the sun derived by location-dependent measurement with multiple photodiodes or light sensor elements. In particular, with a low position of the sun, the glare shield is necessary. The controllable functional element can be, for example, an SPD element (suspended particle device) or an LC element (liquid crystal) or an electrochromic element.
  the intensity (brightness) of display elements in the vehicle interior, for example, LED display elements or OLED display elements or projections with HUD technology. The display elements are, for example, warning lights or information displays, in particular in the form of pictograms or alphanumeric indicators.

The invention is explained in detail in the following with reference to drawings and exemplary embodiments. The drawings are schematic representations and not to scale. The drawings in no way restrict the invention.

They depict.

Figure 1A:
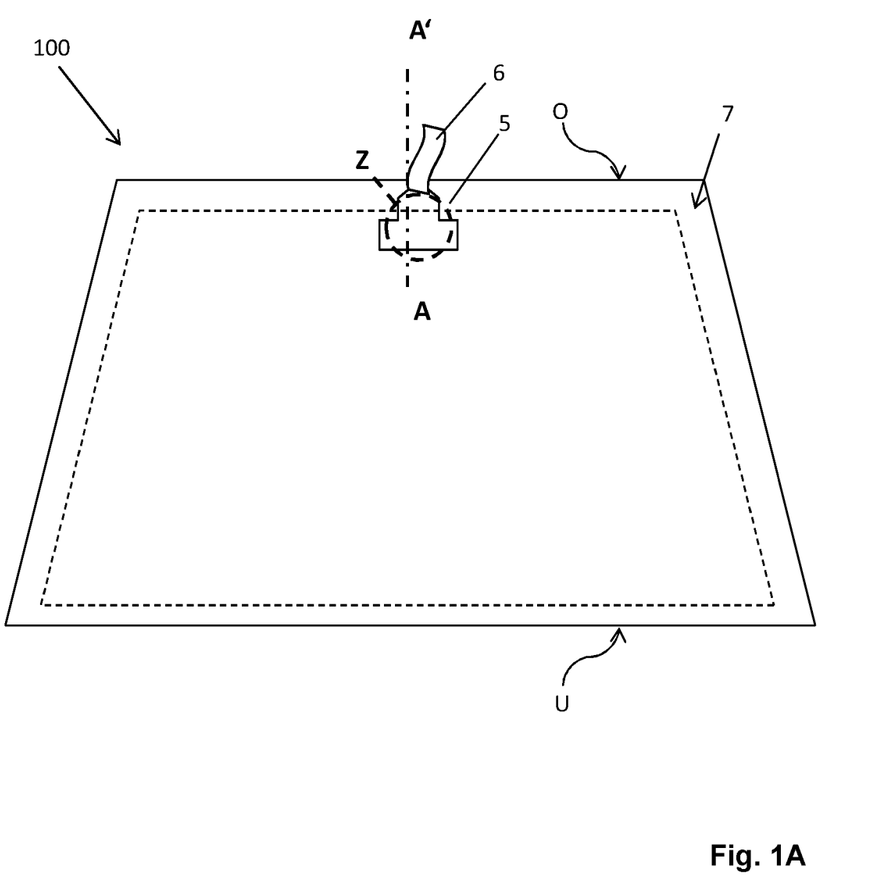
FIG. 1A a plan view of an embodiment of the composite vehicle pane according to the invention,
  FIG. 1B a cross-sectional representation along the section line A-A' through the composite vehicle pane of FIG. 1A,
  FIG. 2A a simplified representation of the detail Z of FIG. 1A of an exemplary embodiment with four light sensors according to the invention,
  FIG. 2B a simplified representation of the detail Z of FIG. 1A of another exemplary embodiment with four light sensors according to the invention, and
  FIG. 3 a flow chart of an embodiment of the method according to the invention.
Figure 1B:
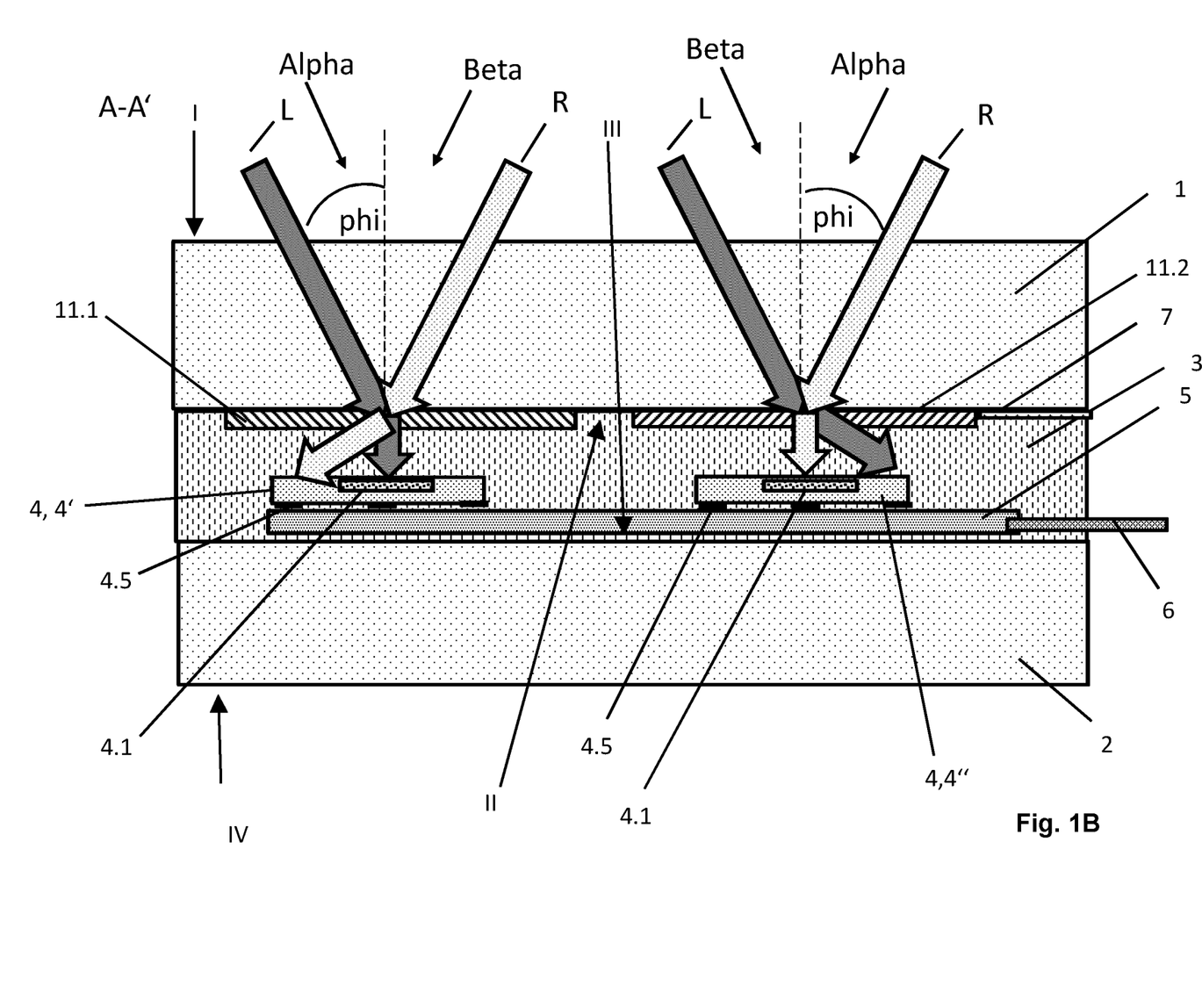

FIG. 1A and 1B depict in each case a detail of a composite pane 100 according to the invention with an integrated light sensor 4 using the example of a composite vehicle pane. The composite pane 100 is made up of an outer pane 1 (with an exterior-side surface I and an interior-side surface II) and an inner pane 2 (with an exterior-side surface III and an interior-side surface IV) that are areally bonded to one another via a thermoplastic intermediate layer 3. The outer pane 1 and the inner pane 2 are made, for example, of soda lime glass and have, for example, a thickness of 2.1 mm. The intermediate layer 3 is formed from a 0.76-mm-thick film made of polyvinyl butyral (PVB). The composite pane is intended, for example, as a windshield of a motor vehicle. It goes without saying the composite pane can also be a different vehicle pane, for example, a roof panel.

In this example, the composite pane 100 is equipped with two light sensors 4 and, for example, with two photodiodes 4. As shown in FIG. 1B, each photodiode 4 has a light-sensitive surface 4.1 on one side and solder connections 4.5 on the opposite side, via which the photodiode 4 can be electrically contacted. It goes without saying that the photodiodes 4 has [sic] further components (not shown here in detail), such as a housing in which a light-sensitive semiconductor chip is arranged, one surface of which forms the light-sensitive surface 4.1. Furthermore, the light-sensitive surface 4.1 is usually covered by a transparent protective layer and protected against mechanical or chemical damage, for example, against moisture. The protective layer can, for example, consist of a thin layer of silicon oxide or silicon nitride.

The photodiodes 4 are arranged on one common flexible printed circuit board 5, which is arranged, by way of example, in the center of the composite pane 100 and in the region of the upper edge O. It goes without saying that one or more light sensors 4 can, in each case, also be arranged at different locations on the composite pane 100, for example, in the region of the corners of the composite pane 100 and/or at the side edges or at the lower edge U. The printed circuit board 5 is arranged completely within the composite pane. It is positioned directly on the exterior-side surface III of the inner pane 2 and is bonded to the outer pane 1 via the intermediate layer 3. It has two electrical connection pads (not shown) that are soldered, in each case, to one pole of a two-pole flat conductor as a connection cable 6. The connection cable 6 extends out of the composite beyond the upper edge O. The connection cable 6 serves to electrically connect the printed circuit board 5 via additional connector cables (typically round cables) to evaluation and control electronics as part of the vehicle's onboard electronics. The evaluation and control electronics analyze the signals of the photodiodes 4—thus, for example, the evaluation and control electronics can switch the vehicle lighting on or off as a function of the amount of ambient light determined by the photodiodes 4, regulate a darkening (not shown here), or control the air conditioning system.

As a result of the plurality of light sensors 4, the system can distinguish between the ambient light that is measured by all light sensors 4 with substantially equal intensity and a local light source such as a streetlight or sunlight, which is measured with sharply different intensity by the distributed light sensors 4. As a result of the additional angular resolution according to the invention of the light sensors 4 according to the invention with holographic optical elements 11, it is possible to draw conclusions as to the exact direction of incidence of the light source.

Suitable as light sensors 4 are, for example, SMD photodiodes of the type APDS-9005 from the company Avago Technologies. They have advantageously small dimensions (height 0.55 mm, width 1.6 mm, depth 1.5 mm) and a spectral sensitivity distribution that very closely mimics that of the human eye. The sensitivity maximum is approx. 500 nm; and in the entire range from 500 nm to 600 nm, the sensitivity is more than 60% of the maximum value at 500 nm. This ensures that the amount of light measured by the light sensor also matches that considered relevant by humans.

It goes without saying that, here and in the following, other sensors that are suitable to detect visible light or invisible infrared or ultraviolet light can also be used as the light sensor 4.

The printed circuit board 5 is a flexible printed circuit board, comprising an approx. 150-μm-thick polyimide film and conductor tracks printed thereon. Here, for example, all photodiodes 4 of the printed circuit board are arranged in the end section, whereas the lead section serves for the connection to the connection cable 6. Two connection pads (not shown) that correspond to the two poles of the system of conductor tracks and that are in each case soldered to one pole of the two-pole connection cable 6 are arranged at the end of the lead section.

The composite pane 100 has, as is customary for windshields, a frame-like opaque masking print 7. The masking print 7 is implemented, for example, as printed and baked, black enamel on the interior-side surface II of the outer pane 1. The printed circuit boards 5 are arranged in the region of the masking print 7 such that they are visible neither from the outside nor from the inside. The outer masking print 7 on the outer pane 1 has holes at the sites of the photodiodes 4 or the holographic optical elements 11 such that light can fall on the photodiodes 4 and the light sensors 4 can fulfill their function.

In detail, the composite pane 100 has a left light sensor 4' exemplified by a photodiode 4' and a right light sensor 4" exemplified by a photodiode 4".

The holographic optical element 11.1, which is associated with the left light sensor 4', is a right-directed holographic optical element 11.1. It is implemented such that it diffracts light R, striking the holographic optical element 11.1 (or the outer pane 1) from the right such that it is deflected past the light-sensitive surface 4.1 of the light sensor 4'. This occurs, for example, for light from all angles of incidence phi from an angle of incidence range beta of −90° to 0°. The angle of incidence phi is determined relative to the orthogonal of the holographic optical element 11.1 (which, due to the layered structure of the composite pane 100 consisting of substantially parallel layers, also corresponds to the orthogonal of the outer pane 1 of the composite pane 100). I.e., all light with an angle of incidence phi from −90° to 0° is not detected by the light-sensitive surface 4.1 of the light sensor 4'.

The angle system relates here to the "direction" of the holographic optical element. In other words, angles of incidence phi, which describe light R from the direction of incidence from the right in the case of a right-directed holographic optical element 11.1, are counted positively starting from the orthogonal and describe the first angle of incidence range alpha. Angles of incidence phi, which describe light L in the case of a right-directed holographic optical element 11.1 from the direction of incidence from the left, are counted negatively starting from the orthogonal and describe the second angle of incidence range beta.

Thus, light L that strikes the holographic optical element 11.1 (or the outer pane 1) from the left is diffracted such that it partially or completely strikes the light-sensitive surface 4.1 of the light sensor 4'. For example, light from all angles of incidence phi from an angle of incidence range alpha from 0° to 45° relative to the orthogonal of the holographic optical element 11.1 can be at least partially directed to the light-sensitive surface 4.1 of the light sensor 4' and detected there. By means of a suitable design of the holographic optical element 11.1, the size of the illuminated portion on the light-sensitive surface 4.1 depends on the angle of incidence phi. As a result, both the sensitivity of the light-sensitive surface 4.1 can be directed to a first angle of incidence range alpha and the angular resolution in the first angle of incidence range alpha can be significantly increased.

The second, right light sensor 4" has a function that mirrors that of the left light sensor 4'. In other words, the direction of the angle of incidence phi and thus the angle of incidence range alpha and beta are reversed. The holographic optical element 11.2, with which the right light sensor 4" is associated, is a left-directed holographic optical element 11.2. It is implemented such that it diffracts light L that strikes the holographic optical element 11.2 (or the outer pane 1) from the left such that it is deflected past the light-sensitive surface 4.1 of the light sensor 4".

This is done, for example, for light from all angles of incidence phi from an angle of incidence range beta from −90° to 0° relative to the orthogonal of the holographic optical element 11.2. In other words, all light with an angle of incidence phi from −90° to 0° is not detected by the light-sensitive surface 4.1 of the light sensor 4'.

In contrast, light R that strikes the holographic optical element 11.2 (or the outer pane 1) from the right is diffracted such that it strikes the light-sensitive surface 4.1 of the light sensor 4' more or less centrally. For example, light from all angles of incidence phi from an angle of incidence range alpha of 0° to 45° relative to the orthogonal of the holographic optical element 11.2 can be directed at least partially onto the light-sensitive surface 4.1 of the light sensor 4"and detected there. With a suitable implementation of the holographic optical element 11.2, the size of the illuminated portion on the light-sensitive surface 4.1 depends on the angle of incidence phi, which significantly increases the angular resolution in the first angle of incidence range alpha.

Figure 2A:
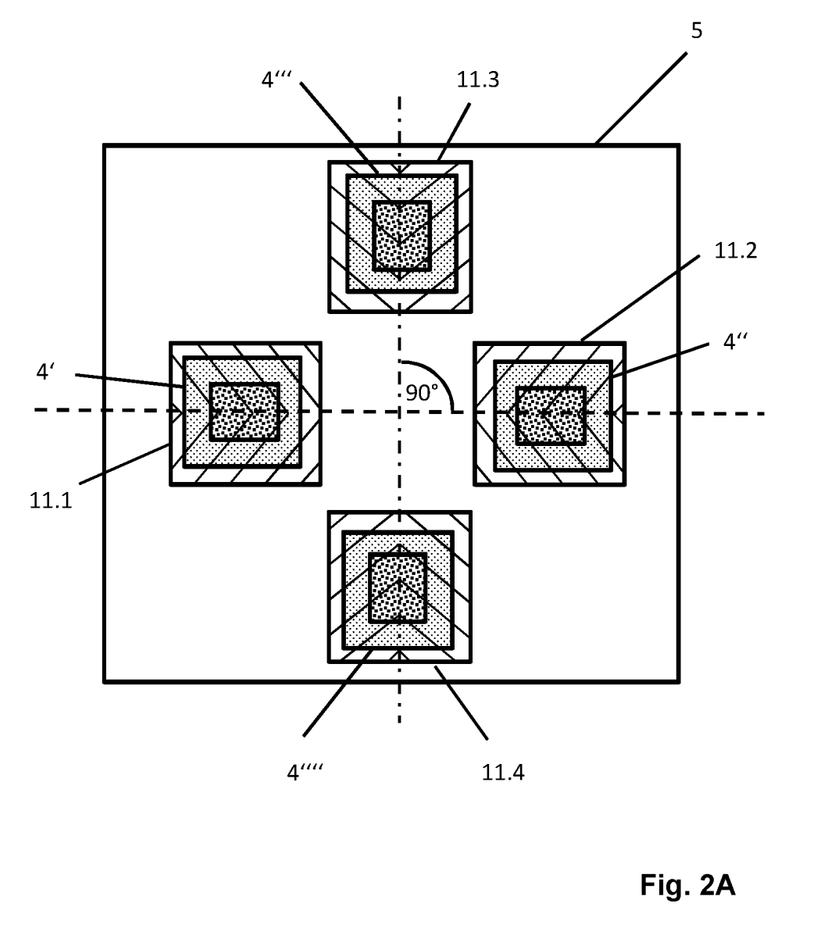

FIG. 2A depicts an example of use with four light sensors 4', 4", 4''', 4'''' using the example of four photodiodes 4', 4", 4''', 4'''' in accordance with an area Z of FIG. 1A. The photodiodes 4', 4", 4''', 4'''' are arranged symmetrically on a printed circuit board 5. The photodiodes 4', 4", 4''', 4'''' form two arrangements (or pairs of two), which correspond in each case to the arrangement of FIG. 1B, wherein the first arrangement consists of the pair of photodiodes 4' and 4" and the second arrangement consists of the pair of photodiodes 4''' and 4''''. As can be discerned from the description concerning FIG. 1B, the photodiodes 4' and 4" are constructed mirror symmetrically in their characteristics relative to light refraction. The same applies to the photodiodes 4''' and 4'''' of the second arrangement. Furthermore, the two arrangements are arranged orthogonally with respect to their characteristics of light diffraction. With the aid of suitable evaluation of the electrical signals, such a configuration enables precise location of light irradiation within a hemispherical spatial element around the outer pane 1.

Figure 2B:
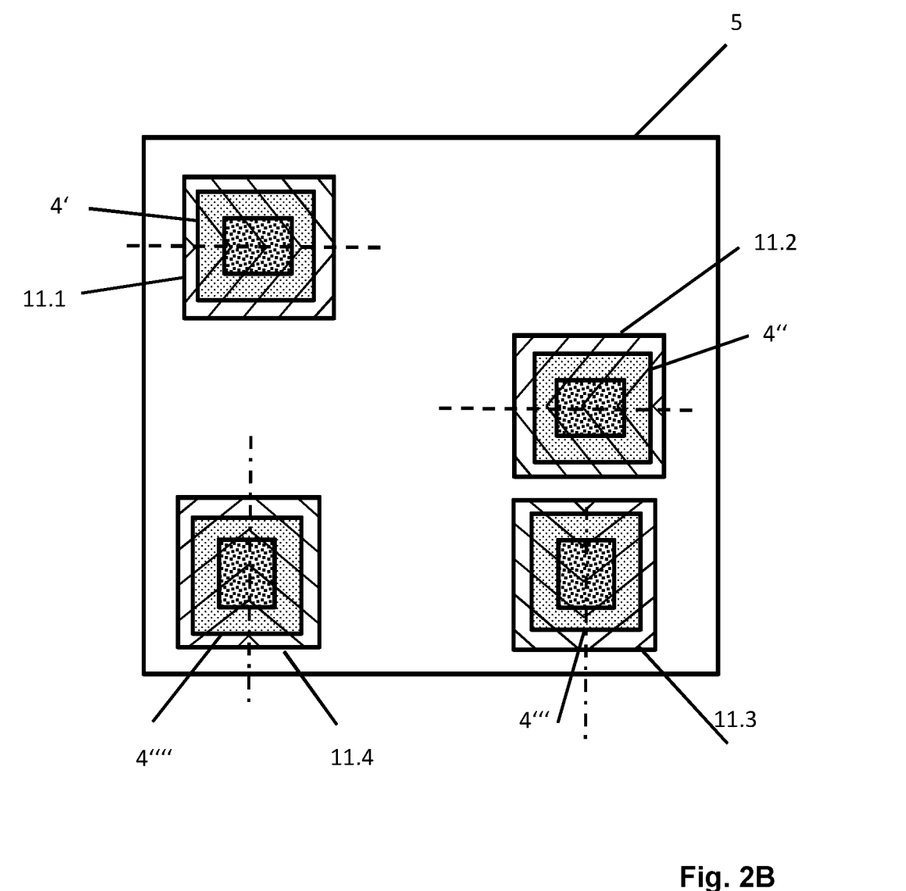

FIG. 2B depicts a modification of the exemplary embodiment of FIG. 2A. The photodiodes 4', 4", 4'", 4"" are freely arranged on a printed circuit board 5. This is particularly advantageous if still more sensors or actuators (not shown here) are to be arranged on the printed circuit board 5 or if the printed circuit board 5 has a particularly irregular shape due to the technical conditions.

The configuration corresponds to the configuration of FIG. 2A, wherein in the first arrangement, the photodiodes 4' and 4" are not arranged in a line, but are offset relative to one another. The same applies to the photodiodes 4'" and 4"". Since the light source of the light irradiation is very far away from the photodiodes 4', 4", 4'", 4"" and the photodiodes 4', 4", 4'", 4"" are arranged very close to one another compared to the distance from the light source, it is possible with this configuration as well to perform precise location of light irradiation within a hemispherical spatial element around the outer pane 1.

Figure 3:
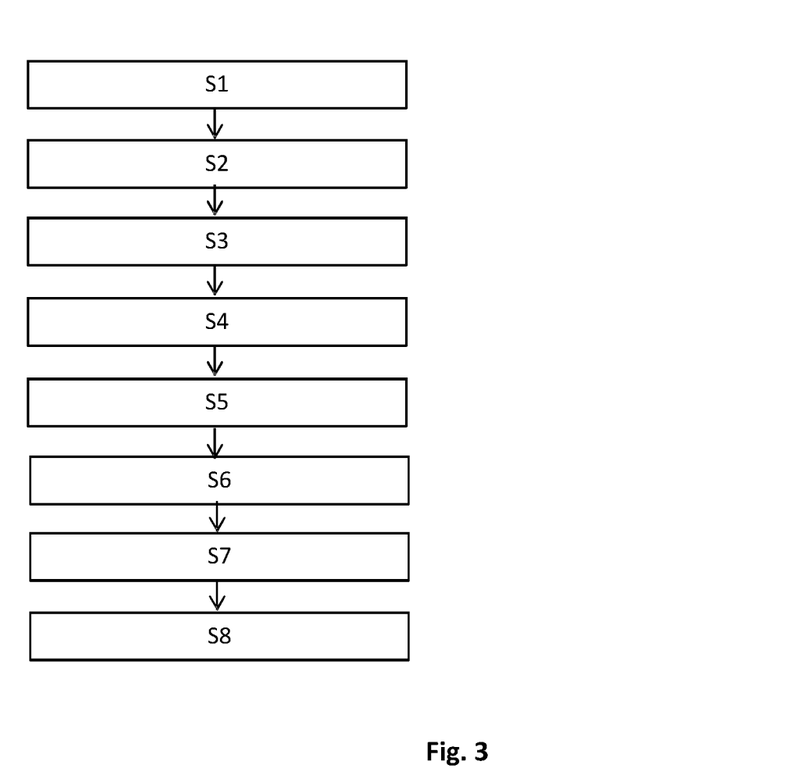

FIG. 3 depicts a flow chart of an exemplary embodiment of the method according to the invention for producing a composite pane 100 with an integrated light sensor 4 with the following exemplary steps:

S1: Producing a printed circuit board 5 with light sensors 4;
S2: Connecting the printed circuit board 5 to a connection cable 6;
S3: Producing indentations in a thermoplastic film, which are matched in size, position, and arrangement to the light sensors 4;
S4: Inserting the light sensors 4 into the indentations of the film;
S5: Providing an inner pane 2;
S6: Placing the thermoplastic film with the printed circuit board 5 on the inner pane 2;
S7: Placing an outer pane 1 on the thermoplastic film;
S8: Laminating the outer pane 1 and the inner pane 2 to form a composite glass, wherein an intermediate layer 3 is formed from the thermoplastic film.

LIST OF REFERENCE CHARACTERS

1 outer pane
2 inner pane
3 thermoplastic intermediate layer
4, 4', 4", 4'", 4"" light sensor, photodiode
4.1 radiation-sensitive surface, light-sensitive surface
4.5 solder connection
5 printed circuit board (PCB)
6 connection cable/flat conductor
7 opaque masking print
11 holographic layer
11.1, 11.3 right-directed holographic optical element
11.2, 11.4 left-directed holographic optical element
100 composite pane, composite vehicle pane
O upper edge of the composite pane
U lower edge of the composite pane
I exterior-side surface of the outer pane 1
II interior-side surface of the outer pane 1
III exterior-side surface of the inner pane 2
IV interior-side surface of the inner pane 2
A-A' section line
alpha, beta angle of incidence range
phi angle of incidence
R incidence of light from the right
L incidence of light from the left
Z enlarged detail

The invention claimed is:

1. A composite pane, comprising:
an outer pane and an inner pane that are joined to one another via at least one thermoplastic intermediate layer, and
at least one light sensor with at least one light-sensitive surface that is arranged between the outer pane and the inner pane,
wherein
the light-sensitive surface faces the outer pane and
a holographic optical element is arranged between the light-sensitive surface and the outer pane,
the holographic optical element is implemented as a hologram for incident-angle-dependent diffraction of the incident light,
the holographic optical element is implemented such that it directs light incident on the outer pane in a first angle of incidence range alpha at least partially onto the light-sensitive surface and directs light incident in a second angle of incidence range beta next to the light-sensitive surface, and
the first angle of incidence range alpha comprises all angles of incidence phi relative to an orthogonal of the holographic optical element from 0° to 60°; and/or the second angle of incidence range beta comprises all angles of incidence phi relative to the orthogonal of the holographic optical element from −90° to 0°.

2. The composite pane according to claim 1, wherein the holographic optical element is arranged directly on the light-sensitive surface and/or on an interior-side surface of the outer pane.

3. The composite pane according to claim 1, wherein the holographic optical element is film-like and has a thickness d from 10 μm to 10000 μm.

4. The composite pane according to claim 3, wherein the thickness d is from 10 μm to 1000 μm.

5. The composite pane according to claim 4, wherein the thickness d is from 100 μm to 500 μm.

6. The composite pane according to claim 1, wherein the light sensor is arranged on at least one printed circuit board.

7. The composite pane according to claim 6, wherein the printed circuit board is a flexible printed circuit board.

8. The composite pane according to claim 1, wherein the composite pane contains at least two light sensors.

9. The composite pane according to claim 8, wherein the composite pane contains exactly two, or exactly four, light sensors.

10. A method for producing a composite pane with an integrated light sensor according to claim 1, comprising:
(a) arranging an outer pane, an inner pane, at least one thermoplastic film, and the light sensors situated on a printed circuit board as a stack such that the film and the light sensors are arranged between the outer pane and the inner pane,
(b) bonding the outer pane to the inner pane by lamination via an intermediate layer formed from the at least one thermoplastic film.

11. The method according to claim 10, wherein prior to step (a), the film is provided with holes or indentations that are matched in size, position, and arrangement to the light sensors and into which the light sensors are inserted during step (a).

12. A method comprising utilizing a composite pane with an integrated light sensor according to claim 1 as a vehicle pane.

13. The method according to claim 12, wherein the light sensors are connected to evaluation and control electronics of the vehicle, and a switching state of the vehicle lighting, a transmittance properties of a pane area, a function of an air-conditioning system, a brightness of HUD displays, and/or an intensity of display elements in the vehicle interior are controlled as a function of the ambient light measured by the light sensors.

14. The method according to claim 12, wherein the vehicle pane is a water, land, or air vehicle.

15. The method according to claim 12, wherein the composite pane is a windshield, rear window, or roof panel of a motor vehicle.

16. The composite pane according to claim 1, wherein the composite pane is a composite vehicle pane.

17. The composite pane according to claim 1, wherein the first angle of incidence range alpha comprises all angles of incidence phi relative to an orthogonal of the holographic optical element from 10° to 30°; and/or the second angle of incidence range beta comprises all angles of incidence phi relative to the orthogonal of the holographic optical element from −30° to −10°.

18. A composite pane, comprising:
an outer pane and an inner pane that are joined to one another via at least one thermoplastic intermediate layer, and
at least one light sensor with at least one light-sensitive surface that is arranged between the outer pane and the inner pane,
wherein
the light-sensitive surface faces the outer pane and
a holographic optical element is arranged between the light-sensitive surface and the outer pane,
the holographic optical element is implemented as a hologram for incident-angle-dependent diffraction of the incident light,
the composite pane contains at least two light sensors, and
the composite pane has a first arrangement of two light sensors with holographic optical elements that are arranged with opposing angle of incidence ranges, and a second arrangement with two light sensors with holographic optical elements that are arranged with opposing angle of incidence ranges, and the first arrangement is arranged orthogonally to the second arrangement.

19. A composite pane, comprising:
an outer pane and an inner pane that are joined to one another via at least one thermoplastic intermediate layer, and
at least one light sensor with at least one light-sensitive surface that is arranged between the outer pane and the inner pane,
wherein
the light-sensitive surface faces the outer pane and
a holographic optical element is arranged between the light-sensitive surface and the outer pane,
the holographic optical element is implemented as a hologram for incident-angle-dependent diffraction of the incident light, and
the holographic optical element is spaced apart from the light-sensitive surface by the at least one thermoplastic intermediate layer.

20. The composite pane according to claim 19, wherein the holographic optical element is implemented such that it directs light incident on the outer pane in a first angle of incidence range alpha at least partially onto the light-sensitive surface and directs light incident in a second angle of incidence range beta next to the light-sensitive surface.

21. The composite pane according to claim 20, wherein the first angle of incidence range alpha comprises all angles of incidence phi relative to an orthogonal of the holographic optical element from 0° to 60°; and/or the second angle of incidence range beta comprises all angles of incidence phi relative to the orthogonal of the holographic optical element from −90° to 0°.

* * * * *